Patented Nov. 9, 1948

UNITED STATES PATENT OFFICE 2,453,232

ANTHRIMIDE CARBAZOLE VAT DYESTUFFS

Walter Kern, Sissach, Paul Sutter, Basel, Eduard Moergeli, Neuewelt, near Basel, and Theodor Holbro, Basel, Switzerland, assignors to the Swiss firm of Ciba Limited No Drawing. Application May 11, 1943, Serial No. 486,582. In Switzerland May 19, 1942

7 Claims. (Cl. 260—316)

The present invention is concerned with new vat dyestuffs of the type containing more than one vattable radical in the dyestuff molecule. It is an object of the invention to provide new dyestuffs of the said type possessing valuable tinctorial properties. More particularly, it is an object of the present invention to provide vat dyestuffs which are especially suitable for printing. Further objects will appear as the specification proceeds.

It is well known in the art that many valuable vat dyestuffs are obtained by the general method which consists in linking together two or more vattable components. Among the vattable components used for this purpose there may be mentioned substitution products of anthraquinone and of higher condensed quinonic ring systems of the carbocyclic or heterocyclic type, such as anthanthrone, dibenzpyrenequinone, pyranthrone, dibenzanthrone, anthraquinone-benzacridone, pyrazolanthrone, thiazolanthrone, anthrapyrimidine, etc. The link between such components may be a nitrogen atom, e. g. in the form of an NH-group, a carbonamide grouping, a non-vattable atomic grouping, e. g. of the aliphatic, aromatic or heterocyclic type. In the case of the so-called anthrimides it is further well known that highly improved products are often obtained by subsequent carbazolation which may be brought about by treating the anthrimides with condensing agents such as sulfuric acid and its derivatives, aluminum chloride, titanium tetrachloride, etc.

The known dyestuffs obtained according to the said general method, although comprising many products of great value, are still defective in several respects, for example in brightness of shade, in fastness to light or to kier-boiling. It is further known that many of the vat dyestuffs thus obtained are not well suited for printed purposes, although they may be very valuable for dyeing. The prints obtained with such dyestuffs may be defective in brightness, strength and fastness or may be uneven, or cannot be obtained in a reliable manner. Some dyestuffs yield prints which materially differ in shade from the dyeings obtained with the same dyestuff. These drawbacks which may occur alone or in combination detract very much from the usefulness of these known dyestuffs and make their application impossible in many instances, where it is otherwise highly desirable in view of their good allround fastness.

It is an object of the present invention to produce new and valuable vat dyestuffs according to the said general method, which dyestuffs are superior to the known dyes in at least part of these respects.

According to the present invention new vat dyestuffs are prepared by linking together at least two vattable components, at least one of which contains the grouping—$SO_nR$, wherein $n$ is 1 or 2 and R stands for an external organic radical.

As mentioned above, it is well known to prepare vat dyestuffs by linking together vattable components. These may contain three condensed nuclei such as is the case in anthraquinones, or more than three condensed nuclei as described above. All these components may carry substituents such as are permissible in vat dyestuffs, for instance halogen, nitro-, amino-, N-substituted aminoalkyl-, hydroxyl- and alkoxy-groups. Linking is effected for example by reaction between a substituent in one vattable component with a suitable substituent in another vattable component. As substituents of this kind there may be mentioned amino-, mercapto-, hydroxyl-groups, halogen atoms which may be attached to a nuclear carbon atom or to a side chain, especially in form of an acid halide group, nitro groups etc. Examples for linking reactions are: the reaction of a primary or secondary amino group with an exchangeable substituent such as halogen, whereby an imino bridge is formed, the reaction of an amino group with an acid group or a functional derivative thereof, whereby an acid amide bridge is formed as well as the formation of other bridges such as sulfide linkage according to methods known per se. Nitrogen-containing linkages appear to be preferred according to the present invention.

During or after the formation of a bridge of the said character linking together may be completed or intensified by further reactions such as the formation of heterocyclic rings as in carbazoles, imidazoles, oxazoles, thiazoles, etc.

Whereas a link according to the present invention may consist of only one atom, e. g. a nitrogen atom, or few atoms, e. g. a carbonamide group, it may also consist of a plurality of atoms or atomic groupings. This latter kind of linkage is obtained if two or more vattable components are linked together by means of other, if desired non-vattable radicals, which may themselves consist of rings or ring systems, for example if carboxylic acids containing more than one carboxylic acid groups (preferably in form of their acid halides) are condensed with vattable amines. Such acids are, e. g. aliphatic di- and poly-carboxylic acids, such as oxalic acid, aromatic acids, such as fluoranthene dicarboxylic acids, phthalic acids, as well as heterocyclic acids, such as thianthrene dicarboxylic acids. In an analogous manner other compounds such as cyanuryl chloride may be used. Furthermore, non-vattable aromatic or heterocyclic compounds containing halogen or other exchangeable substituents in the nucleus such as dibromofluoranthene, dibromochrysene, dibromonaphthalenes, dibromobenzenes etc. may be condensed with vattable amines.

The choice of the vattable components is to be made in such a manner that at least one contains the grouping —$SO_nR$, wherein $n$ is 1 or 2 and R is an external radical. Many valuable dyestuffs are obtained according to the present invention if only one component used for the preparation of the dyestuff contains the said grouping $SO_nR$, but this grouping may also occur more than once, e. g. twice, in two of the components used. The whole dyestuff molecule according to the present invention consists of two vattable radicals such as in dianthrimides, which may be of the $\alpha:\alpha'$ or $\alpha:\beta'$-type, or of three vattable radicals such as in trianthrimides wherein as well the $\alpha:\alpha'$- or $\alpha:\beta'$-type may occur, or if desired of more than three vattable components, or it may comprise two vattable components interconnected by a non-vattable radical etc., as described above.

Among the groupings —$SO_2$—R sulfones are to be mentioned first (wherein $n$ equals 2). Sulfoxides are as a rule capable of oxidation to form sulfones. Therefore it is in many instances possible to oxidize dyestuffs according to the present invention containing one or more sulfoxide groupings to the corresponding sulfones, if such are aimed at.

The radical R appearing in the abovementioned grouping —$SO_n$—R may be any organic radical, but is preferably of not too high molecular weight; it may contain, e. g. from 1 up to 10 carbon atoms and may be aliphatic or aromatic. Aliphatic radicals of low molecular weight such as methyl, ethyl, propyl, isopropyl, butyl are often suitable, but aromatic radicals such as phenyl or naphthyl radicals yield very valuable dyestuffs as well.

These radicals R are preferably bound to the —$SO_n$— group by means of a carbon atom. They may carry substituents preferably those normally occurring in vat dyestuffs (which are devoid of solubilizing action). Finally, the said radicals R are external, i. e. they are not to serve as a link in the sense of the above explanations, but are to be attached to only one vattable component and by means of the said —$SO_n$-grouping only.

The grouping —$SO_n$—R can be attached to a vattable component in the most diverse way. For example, it may be bound directly to a ring carbon atom of a vattable ring system (cf. U. S. Patent No. 2,176,630) wherein a general method for the manufacture of such compounds is described) or it may be attached to a side chain or a substituent contained in the vattable component. Since acylamino groups frequently occur in vattable components, the grouping —$SO_nR$ may be fixed to a carbon atom of such an acylamino group. The acyl groups in such acylamino substituents are often derived from aromatic acids such as benzoic acid and its homologues or naphthoic acid. In such cases the —$SO_nR$ grouping is preferably located in the aromatic nucleus of the acyl radical. Examples of such acyl radicals are the following

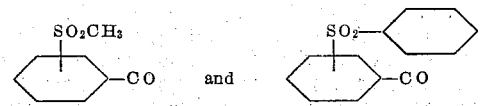

wherein the position of the sulfone group in the benzoyl radical appears to be of little importance.

Particularly valuable dyestuffs are obtained in many cases according to the present invention if aminoacylaminoanthraquinones, such as 1-amino-4-, -5- or -8-benzoylaminoanthraquinones whose acyl radical, for example the benzoyl radical is substituted by a grouping $SO_nR$, e. g. an alkyl- or aryl-sulfone group, or halogenacylaminoanthraquinones of the same kind, are condensed with one another or with other amino- or halogenanthraquinones or with higher condensed vattable components to form anthrimides or similar compounds, and carbazolizing the anthrimides thus obtained. The carbazolation can be effected by methods known in themselves, for example by means of aluminum chloride, if desired with use of indifferent melting agents or diluents, such as common salt, nitrobenzene, pyridine, sulfur dioxide, or in many cases also by means of concentrated sulfuric acid, fuming sulfuric acid or chlorosulfonic acid. Dyestuffs are thus obtained according to the present invention which are distinguished from the corresponding known dyestuffs which do not contain a sulfone group by a better suitability for printing. According to the usual potash printing process, especially by using hydrotropic agents, such as urea, powerful and pure prints are obtained which as regards shade differ only little or not at all from the corresponding dyeings, whereas, as is known, many of the known anthraquinone vat dyestuffs yield only weak prints in potash printing which differ in shade from the dyeings.

The dyestuffs obtained according to the present process are suitable for dyeing and printing the most different materials, e. g. also wool, silk and leather, particularly however cellulose fibers, such as cotton, linen, rayon and cellulose wool from regenerated cellulose. When using these dyestuffs for printing, hydrotropic agents for example ureas, benzylsulfanilic acid alkali salts, thiodiglycol etc. may be applied with advantage in the manner usual for vat dyestuffs. They can also be converted in usual manner into leucoester salts.

The following examples illustrate the invention, the parts being by weight:

*Example 1*

12 parts of 4-(Bz3-methylsulfonbenzoylamino)-5'-benzoylamino-1:1'-dianthrimide of the formula

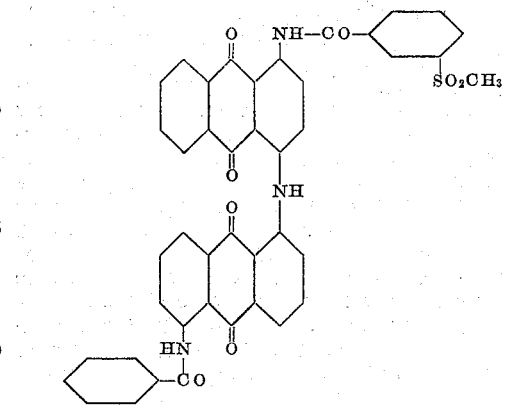

are introduced at 16–21° C. into 270 parts of sulfuric acid of 96 per cent. strength and stirred at this temperature for 16 hours. The solution is poured onto ice, 4.8 parts of sodium dichromate are added and stirring is continued at 68–72° C. during 1½ hours. The dyestuff obtained is filtered off, washed neutral and made into a paste with water. It dyes cotton from a red brown vat pure reddish brown fast tints.

A dyestuff having similar properties is obtained by allowing chlorosulfonic acid to act for a short time at 34–36° C. on the above dianthrimide and subsequent oxidation with sodium perborate.

The 4 - (Bz3 - methylsulfonbenzoylamino) -5'-benzoylamino-1:1'-dianthrimide used in this example can be prepared from 1-amino-4-(Bz3-methylsulfonbenzoylamino)-anthraquinone and 1-chloro-5-benzoylaminoanthraquinone by boiling in nitrobenzene with addition of a copper salt.

The 1-amino-4-(Bz3-methylsulfonbenzoylamino)-anthraquinone is made in usual manner by condensation of 3-methylsulfone-1-benzoylchloride and 1-amino-4-nitroanthraquinone and subsequent reduction with sodium sulfohydrate.

3-methylsulfonbenzene-1-carboxylic acid can be prepared in the following manner:

200 parts of benzoic acid-3-sulfochloride are reduced to 3-mercapto-1-benzoic acid with zinc dust and sulfuric acid and addition of benzene. After distilling the benzene and diluting with water, the reaction mixture is made alkaline and mixed directly with dimethylsulfate, from which the 3-methylmercapto-1-benzoic acid is obtained. The oxidation to 3-methylsulfone-1-benzoic acid can be effected with very good yield in an aqueous alkaline solution with potassium permanganate.

*Example 2*

16 parts of 4-(Bz3-methylsulfonbenzoylamino)-4'-benzoylamino-1:1'-dianthrimide of the formula

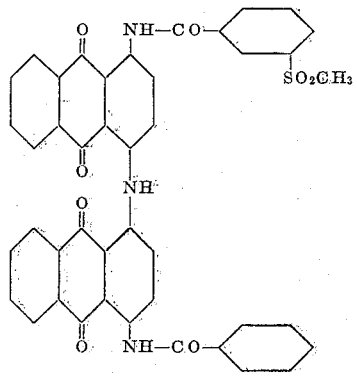

are introduced at 0–10° C. into 360 parts of concentrated sulfuric acid and stirred for 16 hours at a temperature of 16–21° C. The solution is poured onto ice, 4 parts of sodium nitrite are added and the mixture is stirred for 16 hours at 0–16° C. The dyestuff obtained is filtered off, washed neutral and made into a paste with water. It dyes cotton from a red-brown vat fast olive tints.

A very similar dyestuff is obtained when carrying out the after-oxidation with sodium dichromate at 70° C. If the carbazolation is effected at 20–25° C. with sulfuric acid of 85 per cent. strength, a dyestuff is obtained after the after-oxidation with sodium nitrite which dyes cotton also olive tints from a red-brown vat.

A similar dyestuff is also obtained by treating 4:4''-di-(Bz3-methylsulfonbenzoylamino) - 1:1'-dianthrimide with concentrated sulfuric acid as indicated above and after-oxidizing.

The 4 - (Bz3-methyl-sulfonbenzoylamino)-4'-benzoylamino-1:1'-dianthrimide used in the first and second paragraphs of this example can be prepared from 1-amino-4-(Bz3-methylsulfonbenzoylamino)-anthraquinone and 1-chloro-4-benzoylaminoanthraquinone.

*Example 3*

1 part of 4-(Bz3-methylsulfonbenzoylamino)-5'-(Bz3 - methylsulfonbenzoylamino)-1:1'-dianthrimide of the formula

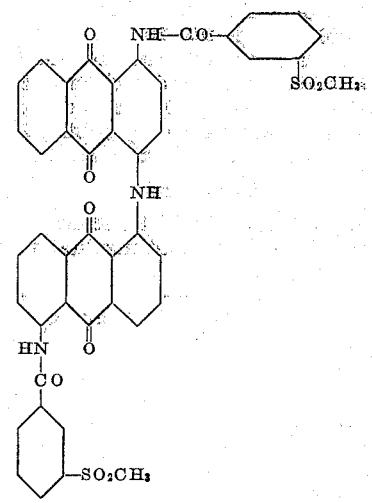

is introduced into 25 parts of sulfuric acid of 96 per cent. strength and stirred for 16 hours at 16–21° C. The solution is poured onto ice, 0.4 part of sodium dichromate is added, and the temperature is raised to 70° C. within 1 hour. After stirring for 1 hour at 70° C., the whole is filtered, washed out and made into a paste with water. The dyestuff dyes cotton from a red brown vat fast brown tints.

A similar dyestuff is obtained by after-oxidizing with sodium nitrite at 0–15° C.

The 4' - (Bz3 - methylsulfonbenzoylamino)-5'-(Bz3-methylsulfonbenzoylamino) - 1:1'-dianthrimide used in the present example is formed with good yield from 1-amino-4-(Bz3-methyl-sulfonbenzoyl)-aminoanthraquinone and 1-chloro-5-(Bz3-methyl-sulfonbenzoyl) - aminoanthraquinone by heating in nitrobenzene with copper catalysts.

1-chloro-5-(Bz3 - methylsulfonbenzoylamino)-anthraquinone can be prepared advantageously from 1-amino-5-chloroanthraquinone and 3-methylsulfone-1-benzoylchloride.

*Example 4*

10 parts of 4-benzoylamino-5'-(Bz3-methylsulfonbenzoylamino)-1:1'-dianthrimide of the formula

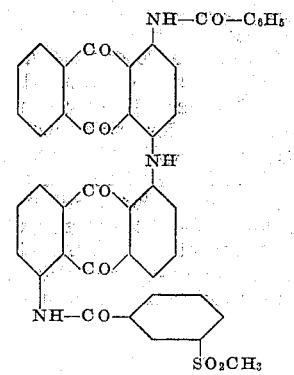

are introduced at 16–21° C. into 210 parts of sulfuric acid of 96 per cent. strength and stirred for 16 hours at this temperature. The solution is carefully poured onto ice, 4.0 g. of sodium dichromate are added in the form of an aqueous solution and stirring is continued for 1½ hours at 68–72° C. The dyestuff obtained is filtered off, washed neutral and made into a paste with water. It dyes cotton from a red brown vat pure fast brown tints.

The 4-benzoylamino - 5' - (Bz3-methylsulfonbenzoylamino)-1:1'-dianthrimide used in this example can be prepared from 1-amino-4-benzoylaminoanthraquinone and 1-chloro - 5 - (Bz3-methyl-sulfonbenzoylamino)-anthraquinone (cf. Example 3, last paragraph) by boiling in nitrobenzene with addition of a copper salt.

Example 5

6 parts of 4-(Bz4-phenylsulfonbenzoylamino)-5'-(benzoylamino)-1:1'-dianthrimide of the formula

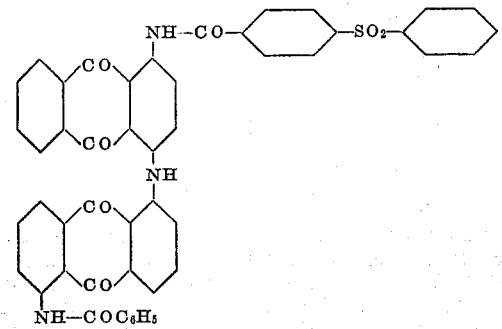

are introduced at 0–6° C. into 100 parts of sulfuric acid of 97 per cent. strength and stirred for 16 hours at a temperature of 17–21° C. The solution is poured onto ice, 1.5 parts of sodium nitrite are added and stirring is continued for 10 hours at 0–16° C. The dyestuff obtained is filtered off, washed neutral and made into a paste with water. It dyes cotton from a red brown vat pure fast red brown tints.

A similar dyestuff is obtained when effecting the after-oxidation with sodium dichromate at 70° C. If 4 - benzoylamino - 5' - (Bz4-phenylsulfonbenzoylamino) - 1:1' - dianthrimide or 4:5'-di-(Bz4-phenylsulfonbenzoylamino)-1:1'-dianthrimide is stirred with concentrated sulfuric acid, dyestuffs are also obtained which dye cotton fast brown tints.

The dianthrimides used in this example can be made from 1-amino-4(Bz4-phenylsulfonbenzoylamino)-anthraquinone and 1-chloro-5-benzoylaminoanthraquinone or 1-amino-4-benzoylamino-anthraquinone and 1-chloro-5-(Bz4-phenylsulfonbenzoylamino)-anthraquinone or 1-amino-4-(Bz4-phenylsulfonbenzoylamino)- anthraquinone and 1 - chloro-5-(Bz4-phenylsulfonbenzoylamino)-anthraquinone, respectively, by boiling in nitrobenzene with copper compounds.

The 1-amino-4-(Bz4-phenylsulfonbenzoylamino)-anthraquinone is formed in usual manner by condensation of 4-(phenylsulfone)-1-benzoylchloride and 1-amino-4-nitroanthraquinone and subsequent reduction with sodium sulfhydrate, whereas 1-chloro - 5 - (Bz4-phenylsulfonbenzoylamino)-anthraquinone is obtained by the action of (4-phenylsulfone)-1-benzoylchloride on 1-amino-5-chloranthraquinone in ortho-dichlorobenzene.

Example 6

4 parts of (Bz4-phenylsulfonbenzoylamino)-4'-benzoylamino-1:1'-dianthrimide are introduced at 0–6° C. into 70 parts of concentrated sulfuric acid of 96.7 per cent. strength and then stirred for 16 hours at a temperature of 17–21° C. The solution is poured onto ice, 0.8 part of sodium dichromate is added, the temperature is raised to 70–73° C. within 2 hours and kept thereat for ¾ hour. The dyestuff obtained is filtered with suction, washed out and made into a paste with water. It dissolves in concentrated sulfuric acid to a red solution and dyes cotton from a red brown vat fast olive tints.

The 4-(Bz4 - phenylsulfonbenzoylamino) - 4' -benzoylamino-1:1'-dianthrimide used in the foregoing paragraph is formed by condensation of 1-chloro-4-benzoylaminoanthraquinone with 1-amino - 4 - (Bz4-phenylsulfonbenzoylamino)-anthraquinone in nitrobenzene in the presence of catalysts at a raised temperature.

Example 7

Sulfurous acid is introduced into a mixture of 180 parts of aluminum chloride and 30 parts of common salt until solution occurs. 12.0 parts of 5-(Bz4-phenylsulfonbenzoylamino)-1:1'-dianthrimide of the formula

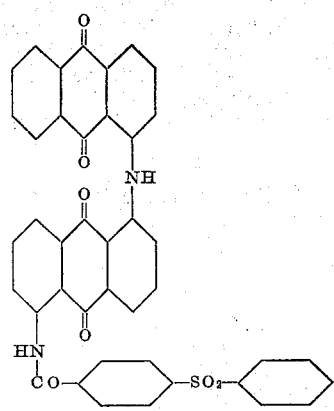

are added in portions, the temperature is raised to 90° C. in the course of 1¼ hours while further introducing sulfurous acid, and this temperature is maintained for ¼ hour. The solution is introduced into a mixture of ice and water, the whole is filtered, washed out, for the purpose of purification made into a paste with water and boiled with dilute sodium hypochlorite solution. The dyestuff obtained is filtered off, washed out and made into a paste with water. It dyes cotton from a yellow brown vat pure orange-yellow tints.

A similar dyestuff is obtained when using dichromate and sodium hypochlorite solution for the after-oxidation. Yellow-brown to brown shades are obtained when using aluminum chloride and pyridine or aluminum chloride and nitrobenzene as carbazolizing agent.

The 5-(Bz4-phenylsulfonbenzoylamino)-1:1'-dianthrimide used in this example can be prepared in usual manner with good yield from 1-aminoanthraquinone and 1-chloro-5-(Bz4-phenylsulfonbenzoylamino)-anthraquinone.

Example 8

2.4 parts of very finely dispersed aminodibenzanthrone, 2.5 parts of 1-chloro-5-(Bz4-phenylsulfonbenzoylamino)-anthraquinone, 0.9 part of calcined sodium carbonate and 0.1 part of copper acetate are stirred in 60 parts of nitrobenzene at 200–216° C. during 8 hours. The whole is filtered after cooling, washed with alcohol and the dyestuff is purified by boiling out with dilute hydrochloric acid. It forms a black powder which dissolves in concentrated sulfuric acid to a violet solution and dyes cotton from a blue vat powerful green-black shades.

Example 9

40 parts of aluminum chloride are stirred into 160 parts of pyridine and 7.5 parts of 4':4'''-di- (Bz3-methylsulfonbenzoylamino)-1':1":1:5-trianthrimide of the formula

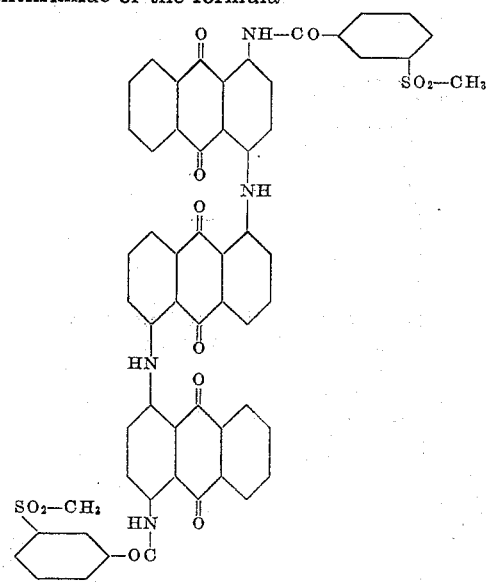

are introduced into this solution and the temperature is raised to 120–125° C. After stirring for 1 hour at this temperature, the still warm melt is poured into dilute caustic soda solution and vatted with addition of sodium hydrosulfite, filtered from impurities, and the dyestuff is blown out with air, filtered off, washed out and dried. It forms a dark powder which dissolves in concentrated sulfuric acid to a brown olive solution and dyes cotton from a bordeaux colored vat strong pure reddish brown shades.

The dyestuff can be further purified by heating with dilute sodium hypochlorite solution.

A similar dyestuff is obtained by heating 4':4"-di-(Bz4-phenylsulfonbenzoylamino)-1':1":1:5-trianthrimide with AlCl₃ and pyridine.

The 4':4"-di-(Bz3-methylsulfonbenzoylamino)-1':1":1:5-trianthrimide used in this example is formed from 2 mols. of 1-amino-4-(Bz3-methylsulfonbenzoylamino)-anthraquinone and 1 mol. of 1:5-dichloroanthraquinone by heating in nitrobenzene with copper catalysts. If 1-amino-4-(Bz3-methylsulfonbenzoylamino)-anthraquinone is replaced by the corresponding quantity of 1-amino-4-(Bz4-phenylsulfonbenzoylamino)-anthraquinone, there is obtained the parent material for the dyestuff of the 3rd paragraph of this example.

Example 10

10 parts of di[4'-(Bz3-methylsulfonbenzoylamino)-1'-anthraquinonyl]-diaminofluoranthene of the formula

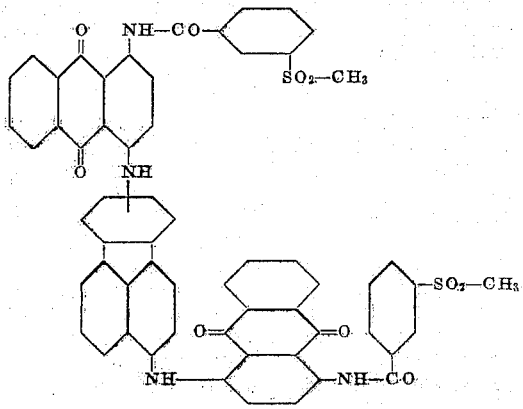

obtainable by the reaction of dibromofluoranthene with 2 mols. of 1-amino-4-(Bz3-methylsulfonbenzoylamino)-anthraquinone are introduced at 60–65° C. into 100 parts of sulfuric acid of 90 per cent. strength and stirred at 60–65° C. for 3–4 hours. The solution is poured onto ice, 3 parts of sodium nitrite are added and the whole is stirred for 16 hours at 0–5° C. The dyestuff obtained is filtered off, washed and dried. It dyes cotton from a black olive vat fast black brown shades.

A similar dyestuff is obtained when treating the reaction product of dibromofluoranthene with 2 mols. of 1-amino-4-(Bz4-phenylsulfonbenzoylamino)-anthraquinone with sulfuric acid.

Example 11

14.5 parts of fluoranthenedicarboxylic acid (cf. Swiss Patent No. 208,531) are converted into the acid chloride by heating with 20 parts of thionylchloride in 750 parts of dry ortho-dichlorobenzene. After distilling off the unconsumed thionylchloride a hot solution of 42 parts of 1-amino-5-(Bz3-methylsulfonbenzoylamino)-anthraquinone in 350 parts of ortho-dichlorobenzene is allowed to flow in at 150° C. The dyestuff formation is complete after stirring for 2 hours at 150–160° C. The dyestuff is filtered in the heat, washed with dichlorobenzene and alcohol and dried. The dyestuff of the formula

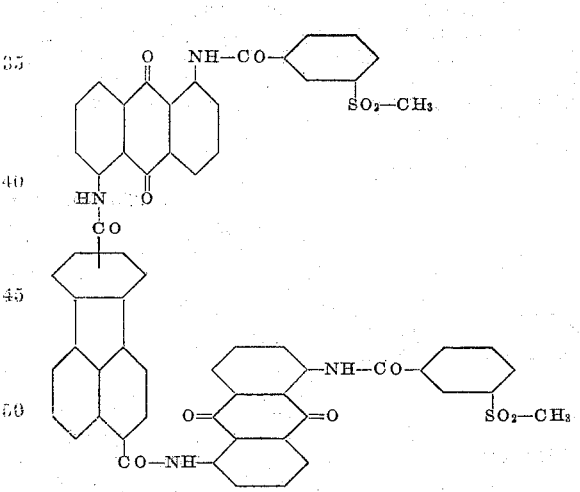

which is obtained in very good yield, is a yellow powder which dissolves in concentrated sulfuric acid to a reddish yellow solution and dyes cotton from a brown vat yellow tints which possess very good fastness properties.

A similar dyestuff is obtained when replacing fluoranthenedicarboxylic acid by thianthrenedicarboxylic acid.

The dyestuff from fluoranthene-dicarboxylic acid and 2 mols. of 1-amino-5-(Bz4-phenylsulfonbenzoylamino)-anthraquinone prepared as described above dyes cotton from a brown vat greenish yellow shades.

Example 12

1.4 parts of 2:7-dichloroanthraquinone, 5 parts of 1-amino-5-(Bz4-phenylsulfonbenzoylamino)-anthraquinone, 3 parts of sodium carbonate and 0.1 part of copper acetate are heated to boiling during 24 hours in 100 parts of nitrobenzene. The dyestuff of the formula

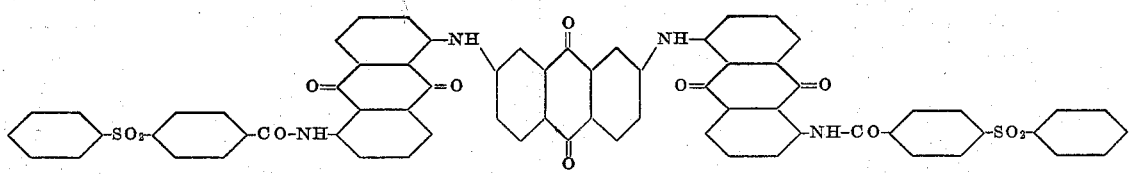

obtained in red brown crystals dissolves in concentrated sulfuric acid to a blue green solution and dyes cotton from an olive brown vat fast red tints.

When replacing the 2:7-dichloroanthraquinone by 2:6-dichloroanthraquinone there is obtained a dyestuff which dissolves in concentrated sulfuric acid to a green blue solution and dyes the vegetable fiber from an olive brown vat powerful red brown shades.

By condensing 1 mol of 2:7-dichloroanthraquinone with 2 mols. of 1-amino-4-(Bz4-phenylsulfonbenzoylamino)-anthraquinone there is obtained a product which dyes cotton brown olive shades.

Example 13

5 parts of 1-amino-5-(Bz4-phenylsulfonebenzoylamino)-anthraquinone and 0.6 part of oxalylchloride are heated in 50 parts of nitrobenzene during 1 hour to 150° C. After cooling, the dyestuff is suction-filtered and washed with alcohol. The dyestuff of the formula

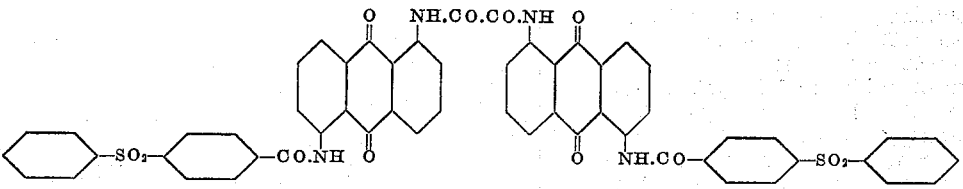

represents a finely crystalline, yellow powder which dissolves in concentrated sulfuric acid to an orange solution and dyes cotton from a green vat powerful green-yellow shades having excellent fastness properties.

When using the equivalent quantity of isophthalic acid chloride instead of oxalylchloride, there is obtained a dyestuff which dyes cotton golden yellow shades.

Example 14

4 parts of 5:5'-di(Bz4-phenylsulfonbenzoylamino)-1:1'-anthrimide (obtained by condensation of 1-amino-5-(Bz4-phenylsulfonbenzoylamino)-anthraquinone with 1-chloro-5-(Bz4-phenylsulfonbenzoylamino)-anthraquinone in nitrobenzene in the presence of sodium carbonate and copper acetate) are stirred in 40 parts of monohydrate during 1 hour at room temperature. The solution is diluted with sulfuric acid of 85 per cent. strength while cooling until the dyestuff is precipitated as sulfate in the form of fine crystals. The whole is filtered, washed with sulfuric acid of 80 per cent. strength and the dyestuff is after-treated with a sodium nitrite solution. The dyestuff of the formula

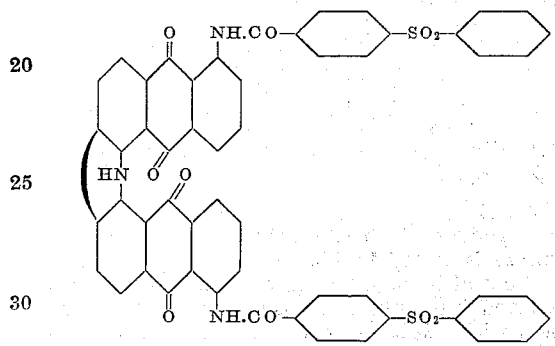

dyes cotton from an olive-brown vat golden yellow fast shades.

Example 15

11.1 parts of 1-amino-4-(Bz3-methylsulfonbenzoylamino)-anthraquinone, 2.5 parts of cyanuric chloride and some diethyl-aniline are heated in 120 parts of nitrobenzene in the course of 6 hours to 110–115° C. After addition of small quantities of sodium carbonate, the temperature is raised to 125–130° C. and maintained for 16 hours. The formed dyestuff is filtered at 70–75° C., washed with nitrobenzene and finally with alcohol, and dried. It is a red crystalline powder which dissolves in concentrated sulfuric acid to a red solution and dyes cotton from a dirty blue red vat red tints.

Example 16

2 parts of the dyestuff obtained according to Example 1 are dispersed in 200 parts of water and vatted by means of 4 parts of sodium hydrosulfite at 40–50° C. after addition of 8 parts by volume of caustic soda solution. This stock vat is poured into a dye-bath containing in 2000 parts of water 6 parts by volume of caustic soda solution of 36° Bé. and 2 parts of sodium hydrosulfite. 100 parts of cotton are introduced at 40° C., 40 parts of common salt are added after ¼ hour and dyeing is continued for 1 hour at 40–50° C. The cotton is squeezed out as usual, oxidized, rinsed, acidified, rinsed and soaped at the boil. It is dyed fast reddish brown shades.

*Example 17*

The following printing preparation is made with an aqueous dyestuff paste of 6 per cent. strength of the dyestuff to Example 1:

| | Grams |
|---|---|
| Dyestuff paste | 200 |
| Potash thickening | 600 |
| Urea | 100 |
| Sodium formaldehyde sulfoxylate | 100 |
| | 1,000 |

A cotton fabric is printed with this preparation, dried and steamed for 5 minutes in the Mather-Platt, free from air, oxidized in the air, rinsed and soaped as usual. There is obtained a powerful reddish brown print, the shade of which corresponds with the dyeing obtained according to Example 16.

When using the corresponding printing preparation without urea, there is obtained a slightly weaker print which, however, is also pure.

What we claim is:

1. An anthrimide carbazole consisting of two anthraquinone radicals, one of which contains, as nuclear substituent, an aroylamino group the aryl radical of which carries an —$SO_2$—R group, wherein R stands for a hydrocarbon radical containing up to ten carbon atoms, the —$SO_2$— group being connected to a carbon atom on each side.

2. An anthrimide carbazole consisting of two anthraquinone radicals, one of which contains, as nuclear substituent, a benzoylamino group the aryl radical of which carries an —$SO_2$—R group, wherein R stands for a hydrocarbon radical containing up to ten carbon atoms, the —$SO_2$— group being connected to a carbon atom on each side.

3. The anthrimide carbazoles of the general formula

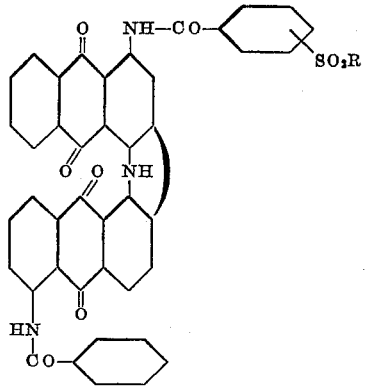

wherein R stands for a hydrocarbon radical containing up to ten carbon atoms.

4. The anthrimide carbazoles of the general formula

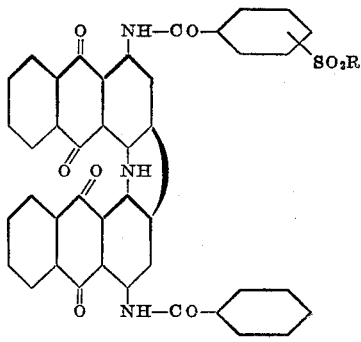

wherein R stands for a hydrocarbon radical containing up to ten carbon atoms.

5. The anthrimide carbazole of the formula

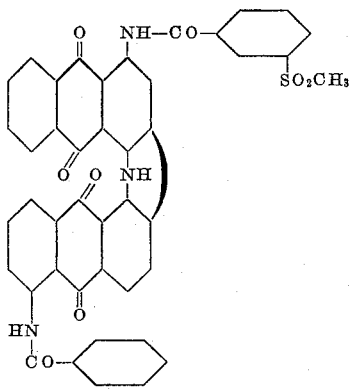

6. The anthrimide carbazole of the formula

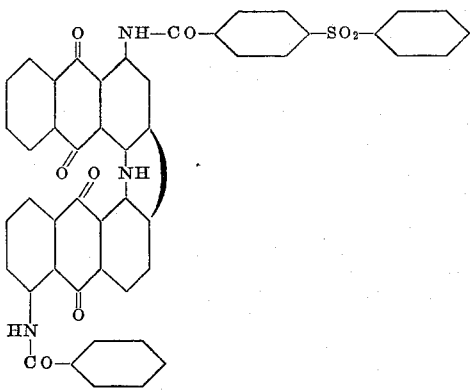

7. The anthrimide carbazole of the formula

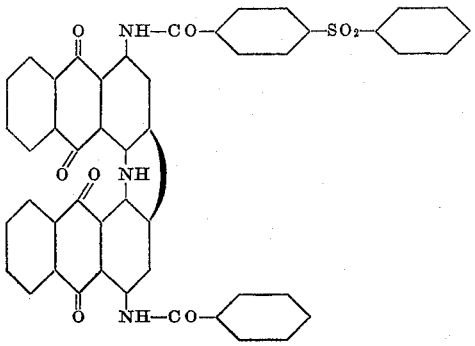

WALTER KERN.
PAUL SUTTER.
EDUARD MOERGELI.
THEODOR HOLBRO.

REFERENCES CITED

The following references are of record in the file of this patent:

UNITED STATES PATENTS

| Number | Name | Date |
|---|---|---|
| 993,735 | Thomaschewski | May 30, 1911 |
| 1,667,848 | Gassner | May 1, 1928 |
| 1,856,207 | Bruns | May 3, 1932 |
| 1,885,172 | Baumann | Nov. 1, 1932 |
| 1,935,929 | Zahn | Nov. 21, 1933 |
| 2,027,658 | Weirand et al. | Jan. 14, 1936 |
| 2,033,316 | Zahn | Mar. 10, 1936 |
| 2,073,022 | Mieg | Mar. 9, 1937 |
| 2,162,196 | Deinet | June 13, 1939 |
| 2,190,751 | Zerweck | Feb. 20, 1940 |
| 2,356,061 | Irving et al. | Aug. 15, 1944 |

Certificate of Correction

Patent No. 2,453,232. November 9, 1948.

WALTER KERN ET AL.

It is hereby certified that error appears in the printed specification of the above numbered patent requiring correction as follows:

Column 1, line 40, for the word "printed" read *printing*;

and that the said Letters Patent should be read with this correction therein that the same may conform to the record of the case in the Patent Office.

Signed and sealed this 22nd day of March, A. D. 1949.

[SEAL]

THOMAS F. MURPHY,
*Assistant Commissioner of Patents.*